April 23, 1963 P. R. M. GOIN ETAL 3,086,771
SHEET FEEDING APPARATUS
Filed March 15, 1960 9 Sheets-Sheet 1

April 23, 1963   P. R. M. GOIN ETAL   3,086,771
SHEET FEEDING APPARATUS
Filed March 15, 1960   9 Sheets-Sheet 8

3,086,771
SHEET FEEDING APPARATUS
Pierre Raymond Michel Goin, Fontenay-sous-Bois, and Roger Jules Jacques Urvoy, Charenton, France, assignors to Compagnie des Machines Bull (Societe Anonyme), Paris, France
Filed Mar. 15, 1960, Ser. No. 15,206
Claims priority, application France Mar. 17, 1959
16 Claims. (Cl. 271—31)

The present invention relates to apparatus utilising pneumatic devices for separately removing sheets from a stack of sheets and advancing them one after the other to a required position at predetermined instants.

The invention concerns more especially an apparatus of novel type which is capable of uninterruptedly carrying out the aforesaid operations at very high speed when the sheets of a stack are of different sizes.

Apparatus designed to extract one sheet, and one only, from a stack at each instant under regular conditions of alignment and synchronisation are known. These apparatus are not entirely satisfactory and auxiliary devices designed to compensate for the defects in the alignment of the sheets and in the synchronisation of their feed advance must be provided in machines fed by such apparatus.

A general object of the present invention is to provide a novel solution to the problem of feeding the sheets as hereinbefore stated.

A more particular object of the invention consists in providing a solution to this problem in the case where the charging of a considerable quantity of sheets of various sizes must be able to take place during the operation of the apparatus.

The apparatus according to the invention has, as compared with known apparatus, the advantage that it ensures greater regularity in the feeding of the sheets, that is to say, of ensuring a constant framing of the said sheets, so that it becomes unnecessary to provide the machines fed by such apparatus with devices for compensating for defects in framing.

The apparatus with which the invention is more particularly concerned comprises a feed drum within which an appreciable negative pressure obtains. The periphery of the said drum is formed with a number of suction orifices to which the said negative pressure is applied at precise instants in order to cause the first sheet to adhere to the drum by suction and then to carry it forward.

In accordance with one feature of the invention, the initial separation of the first sheet to be extracted from the stack is very simply effected by directing a jet of compressed air on to the surface of the drum almost perpendicularly to the said surface, in the neighbourhood of the leading edge of the said sheet in the driving movement of the latter.

That portion of the sheet which is situated along the said edge then moves towards the drum without adhering thereto. At the precise instant when the negative pressure obtaining within the drum is applied to the suction orifices, the sheet adheres to the drum under the action of the suction and also under the action of the jet of compressed air which, from that instant, blows between the said sheet and the succeeding sheet and thus accelerates the movement. The passage of the air between the first sheet and the succeeding sheet also reduces the friction forces between the said sheets. The application of the negative pressure to the orifices formed in the periphery of the drum is effected through a shut-off device disposed within the drum. The arrangement is such that the losses of head are very small and that a high tractive force is applied to the sheets at precise predetermined instants.

In the case of machines operating at high speed and fed with sheets by an apparatus according to the invention, it is essential that their operation should not be interrupted. An interesting feature of the invention resides in the fact that it is possible to supply sheets to the feed apparatus in large quantities without interrupting its operation. In order to achieve this result, the sheets are disposed upright on an inclined slideway and advance perpendicularly to their plane towards the feed drum under the action of their own weight or, in accordance with some embodiments of the invention, under the action of a feed device, which may be a feed belt disposed on the slideway. Since the action of gravity is no longer utilised in the latter case for advancing the sheets, the inclination of the slideway may be substantially reduced. However, when a large number of sheets is situated on the slideway their weight is such that the first sheet to be fed is strongly pressed against the plate retaining the stack in the neighbourhood of the drum and may be incorrectly driven by the latter.

In order that the sheet-by-sheet feed may take place correctly regardless of the number of sheets situated on the slideway, the apparatus according to the invention may be provided with means for reducing the frictional forces exerted on the first sheet to be extracted from the stack, on the one hand, and for exerting on the said sheet an additional driving force which is added to that exerted by the feed drum, on the other hand. These means may be utilized either separately or in combination in the sheet feeding apparatus according to the invention.

The means provided for reducing the said frictional forces comprise those which reduce the pressure exerted by the pack of sheets and those which reduce the frictional forces exerted by the member against which the pack of sheets bears.

The jet of compressed air which effects the initial separation of the first sheet from the stack sometimes has the effect of slightly forcing back the said first sheet. According to the invention, means are provided to maintain the first sheet in an appropriate position. In accordance with one feature of the invention, the alignment of the sheets on one of their edges parallel to the driving direction is effected before they are taken from the stack.

When the apparatus receives sheets of different sizes and advances them in a direction parallel to their length after having aligned them as hereinbefore described, the feed drum is covered by each sheet over a length of its generatrices which is equal to the width of the said sheet. In order to obtain the best efficiency from the suction orifices, the latter will be provided only over that part of the drum which is covered by those sheets to be extracted which have the smallest width. Consequently, the sheets of largest width adhere appropriately to the drum only on one side, over that part of their width which covers that portion of the drum in which suction orifices are formed. In order to ensure a good driving of the said sheets, it is proposed in accordance with one feature of the invention to form the drum with circular grooves in the region which is not covered by the sheets of smallest width and to set up in the said grooves a negative pressure which may be of lower value than the negative pressure applied through the previously mentioned orifices.

Generally speaking, in order to facilitate the initial separation of the first sheet to be driven and to improve its adherence to the drum during its extraction, suction nozzles are provided along the said sheet on the same side as the drum.

In order that the extraction of each sheet in an apparatus of the type indicated may take place correctly, it is essential that its forward edge should appropriately bear, at the required instant, against the surface of the extraction member and this condition is satisfied in most cases by the means provided in accordance with the invention for effecting the advance of the sheets in the magazine. However, as previously stated, it is also necessary for the pressure exerted on the first sheet by the other sheets of the stack advancing towards the extraction member to remain below a given value in order to limit to an acceptable value the frictional forces exerted on each sheet during its extraction.

Means are provided in accordance with the invention for simultaneously satisfying these two conditions.

When a feed system of the type indicated comprises a device for advancing the sheets in the magazine, there is provided in accordance with the invention an arrangement for regulating the operation of the said feed device in accordance with the closeness of the stacking of the sheets in the neighbourhood of the extraction member.

The invention is also concerned with means for ensuring correct application of the forward edge of the first sheet against the surface of the drum immediately on retraction of the retaining grippers in the grooves in the drum when the feed apparatus is provided with such members.

A sheet feeding apparatus of the type indicated may therefore comprise in accordance with the invention one or more of the following means:

A member adapted to measure the closeness of the stacking of the sheets situated behind the first sheet to be extracted, which member is disposed in the neighbourhood of the forward edge of the said sheets. The said measuring member consists of a nozzle communicating with a source of compressed air. The orifice of the said nozzle is situated on that face of the wall of the magazine on which the forward edge of the sheet rests, so that the flow of air from the said nozzle depends upon the quantity of air which can escape between the sheets situated in front of the said nozzle.

The flow of air leaving the said nozzle is measured by means of a differential pressure-measuring capsule acting on an electric contact to control the motor driving the sheet feeding apparatus.

The nozzle has an orifice whose dimension in the direction of feed advance of the sheets, that is to say, perpendicularly to the plane of the sheets, is a multiple of the thickness of the said sheets, so that a number of sheets can be simultaneously situated in front of the said orifice in the course of their advance towards the extracting position. The flow of air leaving the nozzle is then to some extent independent of the irregularities of alignment of the leading edge of the sheets, the mean position of which may be maintained substantially constant, and it depends only upon the intervals between the sheets which are situated in front of the orifice and between which air can pass.

When the feeding apparatus comprises retaining grippers, at least one of the said grippers is formed with a suction orifice continuously or intermittently communicating with a vacuum pump, the opening of the said orifice being so disposed that the gripper, during its retraction movement, carries along the leading edge of the first sheet towards the extracting member as a result of the suction effect exerted by the orifice.

A blowing nozzle, which may be that provided to measure the closeness of the stacking, is disposed at the end of the slideway in the neighbourhood of the extracting position in front of the path followed by the leading edge of the first sheet during the driving of the said edge by the nozzle mounted on the retaining gripper.

When the feed apparatus comprises a suction cowl fixedly disposed in grooves in the extracting member, the gripper located in the retracted position in front of the said cowl consists of parts forming a lattice in front of the opening of the said cowl so that, on the one hand, the suction effect produced by the cowl can be exerted through the gripper, while on the other hand the sheet is sufficiently maintained by the parts constituting the gripper so that it is not deformed by the suction effect by which it is applied against the extracting member while the gripper is in the retracted position.

For a better understanding of the invention and the method by which it is to be performed, the same will now be described, by way of example, with reference to the accompanying drawings, in which.

Figure 1:
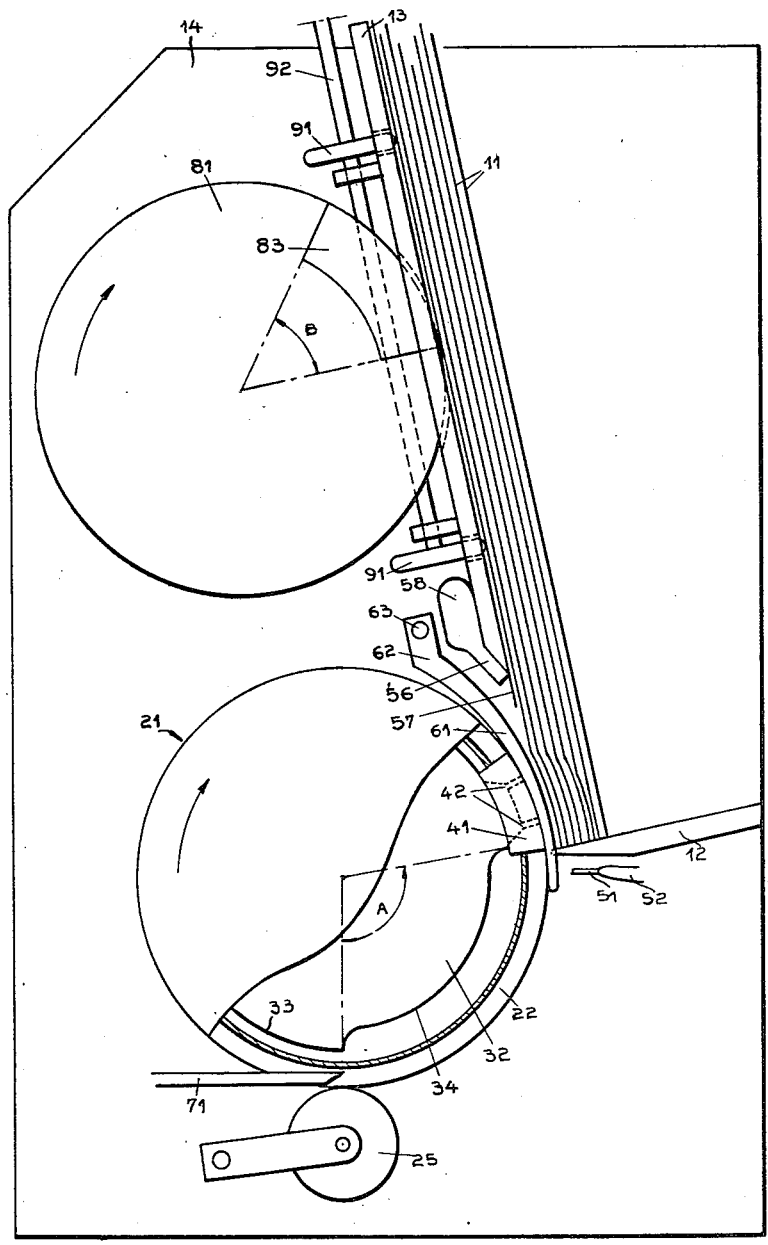
FIGURE 1 is an elevational view of an apparatus according to one embodiment of the invention, one element being broken away in order more clearly to show the others.
Figure 4:
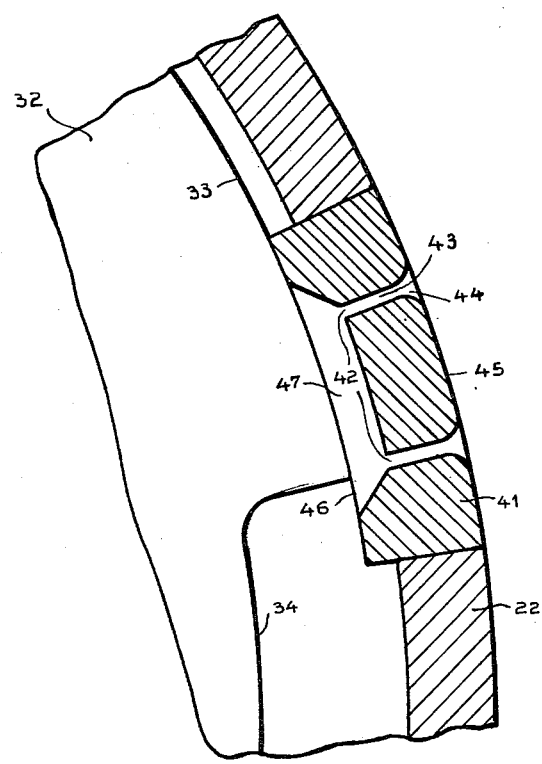
Figure 6:
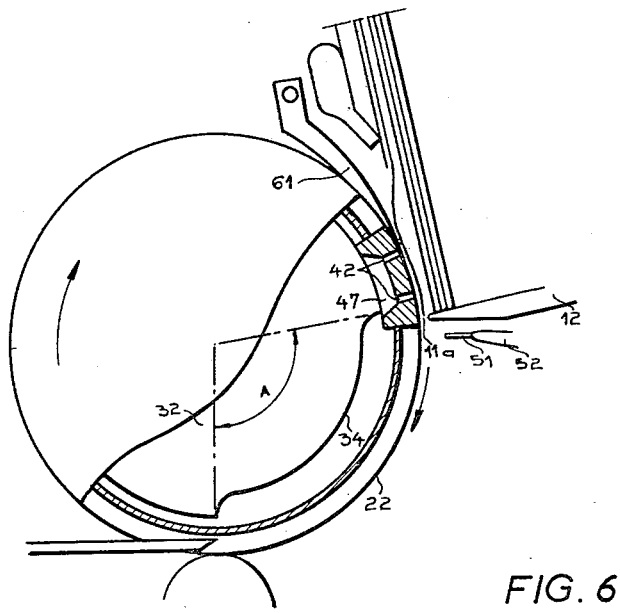
Figure 7:
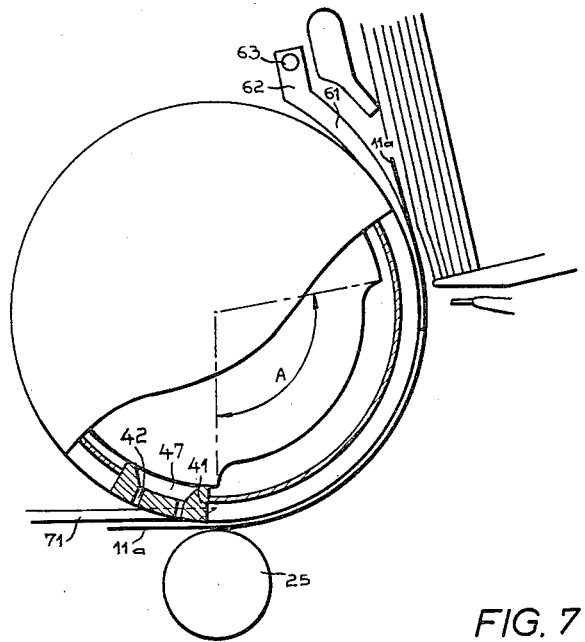
Figure 8:
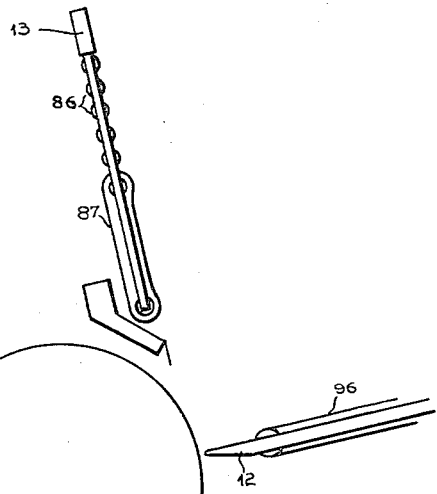
Figure 9:
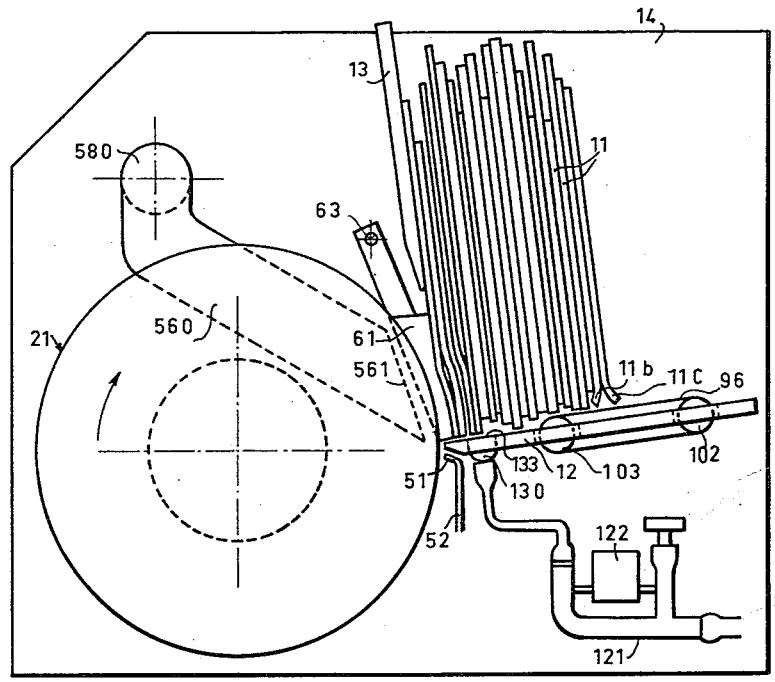
Figure 10:
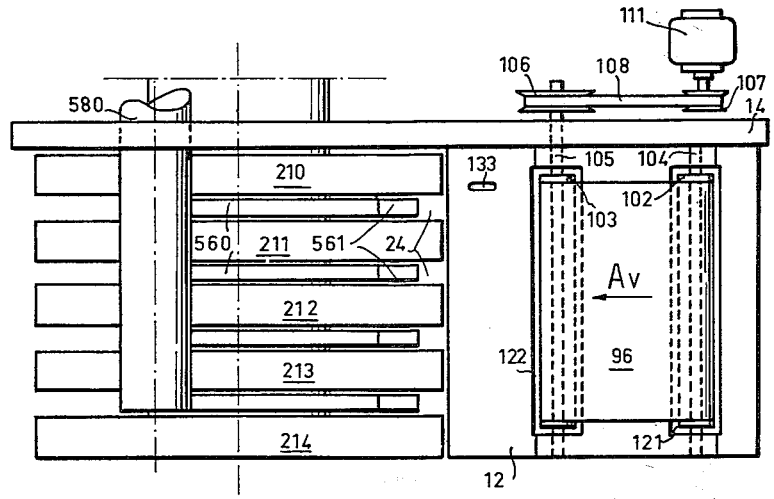
Figure 11:
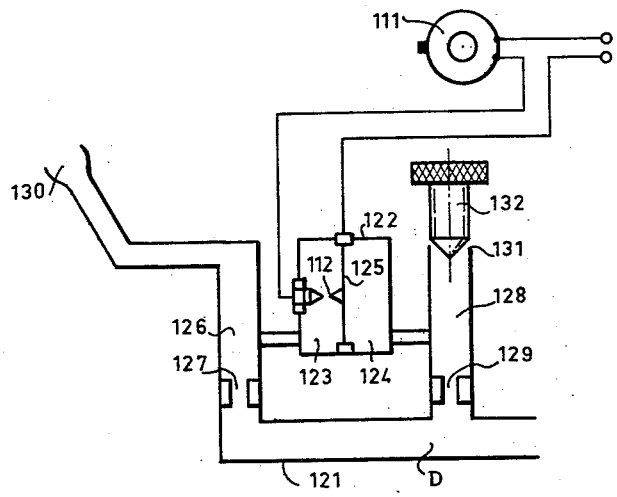
Figures 12, 13:
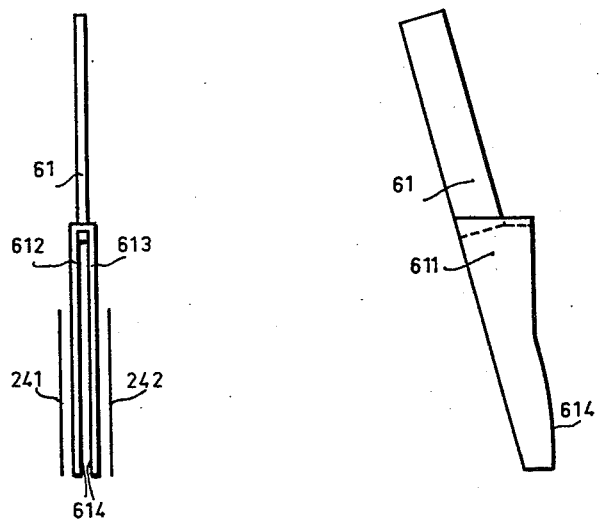
Figure 14:
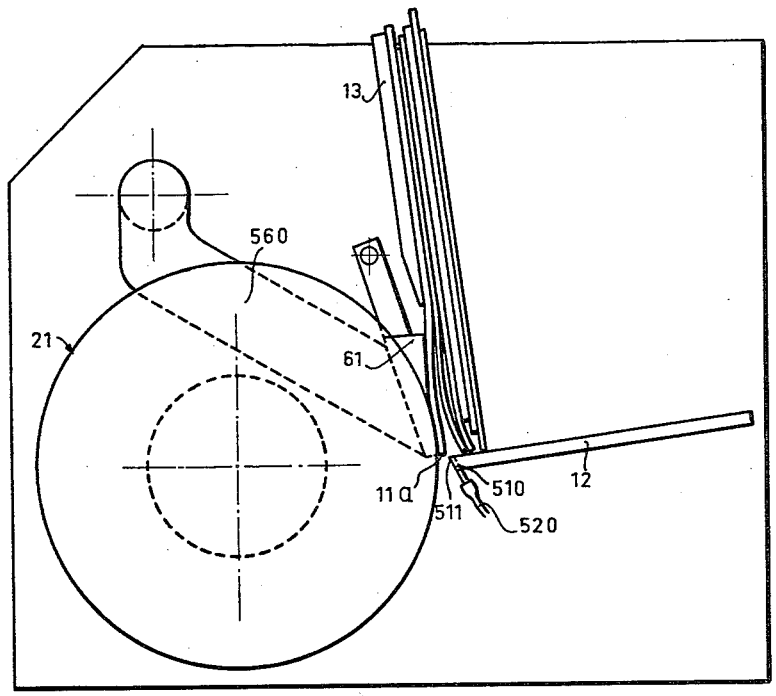
Figure 16:
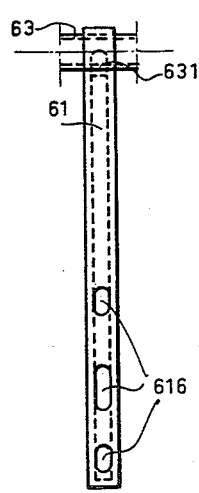
Figure 15:
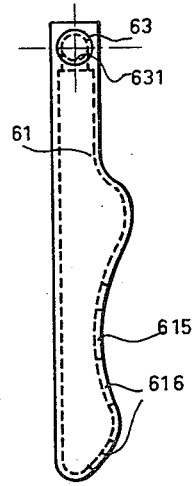
Figure 17:
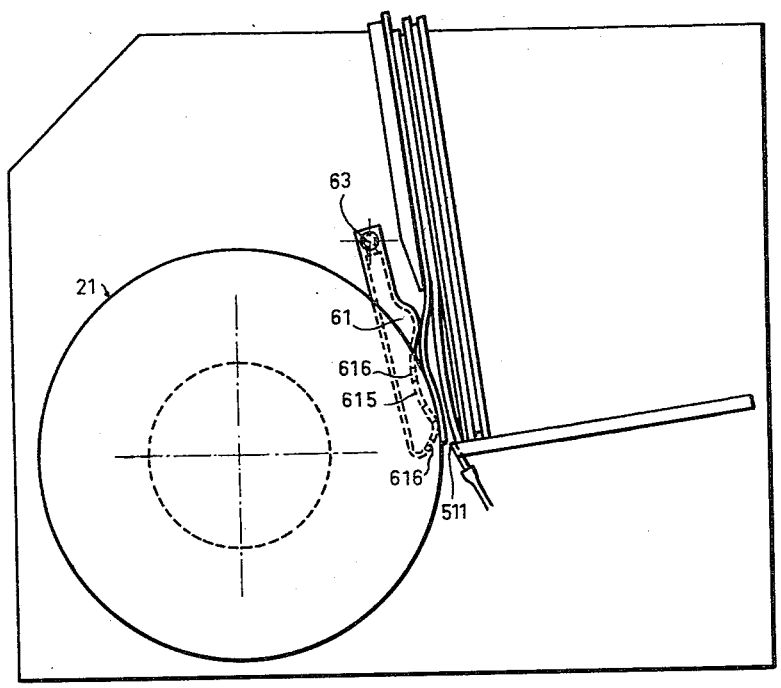
Figure 18:
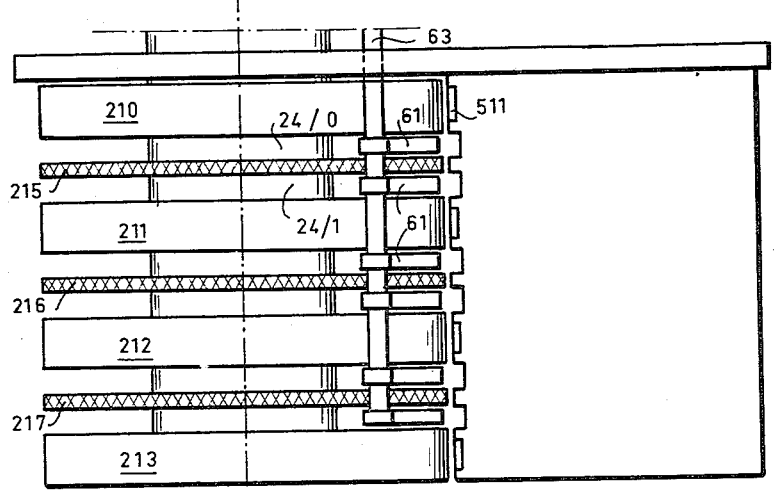

FIGURE 4 is a section drawn to a larger scale, along the line 4—4 through a part of FIGURE 2, FIGURES 5, 6 and 7 are views similar to FIGURE 1, showing various phases of the operation of the apparatus, FIGURE 8 is a view similar to FIGURE 1 showing a modified embodiment of the invention, FIGURE 9 is an elevational view of the feeding apparatus provided with a device for detecting the closeness of the stacking of the sheets and provided with a device for applying the sheets to the extracting member according to the invention, FIGURE 10 is a view from above of the apparatus illustrated in FIGURE 9, some of the parts having been omitted for the sake of clarity, FIGURE 11 is a functional diagram of the device for detecting the closeness of the stacking of the sheets, FIGURES 12 and 13 are a side view and a front view respectively of a retaining gripper according to a first modification of the invention, FIGURE 14 is a view similar to FIGURE 9, showing in retracted position the retaining gripper illustrated in FIGURES 12 and 13, FIGURES 15 and 16 are a side elevation and a front elevation respectively of a retaining gripper according to a second modification of the invention, FIGURE 17 is a view similar to FIGURE 14, showing in the retracted position the retaining gripper illustrated in FIGURES 15 and 16, and FIGURE 18 is a view similar to FIGURE 10, showing in the retracted position retaining grippers such as that illustrated in FIGURES 15 and 16 and showing in addition a particular constructional form of the feed drum according to the invention, It will be seen in FIGURE 1 that the sheets 11 to be driven are disposed on edge on an inclined plate 12 and that the front face of the first sheet to be driven bears, except along its lower portion, against a plate 13 substantially perpendicular to the plate 12. A vertical wall 14 (FIGURES 1 and 2) retains the sheets laterally along one of their vertical edges.

Figure 2:
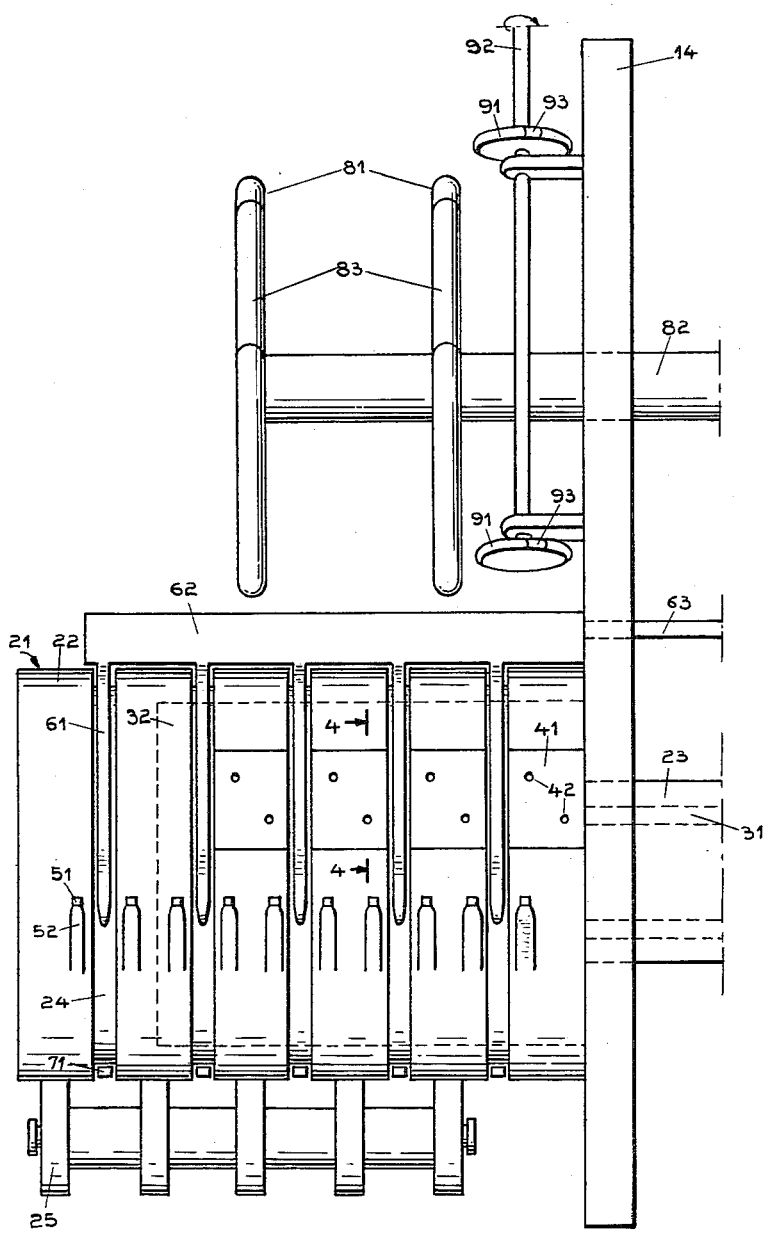
FIGURE 2 is a side view of the drum illustrated in FIGURE 1, some of the parts having been omitted for the sake of clarity.
Figure 3:
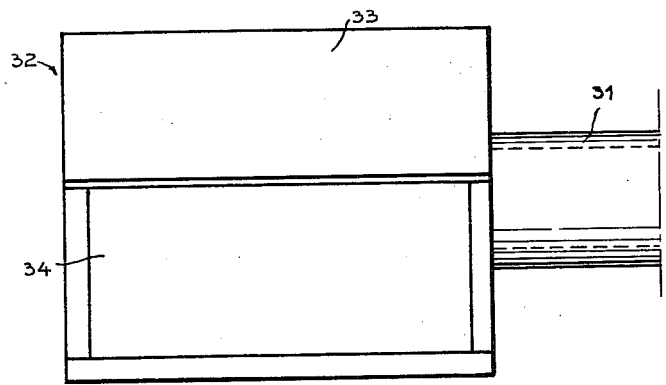
FIGURE 3 is a side view of the shut-off member.

The main device for the extraction of sheets, which is denoted by the reference 21, consists of a drum 22, the axis of which is horizontal. The said drum is driven by a hollow shaft 23 (FIGURE 2), through which there extends a tube 31 supporting a shut-off member 32 (FIGURES 1 to 3). The said tube 31 affords communication between the interior of the drum 22 and a vacuum pump or any other system (not shown) which is capable of establishing and maintaining a given negative pressure within the drum.

The external cylindrical surface 33 (FIGURES 1 and 3) of the shut-off member 32 is centered on the same axis as the drum and is formed with an aperture 34 (FIGURES 1 and 3) situated within the angle A (FIGURE 1).

A portion of the cylindrical wall of the drum consists of a bar 41 (FIGURES 1 and 2) formed with a series of circular orifices 42. As is shown in FIGURE 4, which is a section along the line 4—4 through a portion of FIGURE 2, each orifice comprises a cylindrical portion 43 and a flared portion 44. The section of the flared portion taken along the plane of the figure is approximately a circle whose radius is equal to the diameter of the cylindrical portion.

The external face 45 (FIGURE 4) of the bar 41 is a convex cylindrical surface. It will advantageously be knurled or coated with a substance having a high coefficient of friction. The inner face 46 is a concave cylindrical surface. This face bears against the outer cylindrical surface 33 of the shut-off member during rotation of the drum. The contacting surfaces, which are carefully treated and mounted, form an air-tight joint.

The bar is formed with a cavity 47 the object of which is, as will hereinafter be explained, to place all the orifices 42 simultaneously in communication with the aperture 34 of the shut-off member.

A presser roller 25 disposed below the drum 22 in FIGURE 1 mechanically drives the sheets as soon as their leading edge has been introduced between the said roller and the drum by the pneumatic driving means.

The retaining grippers 61 (FIGURES 1, 2 and 7) provided on the member 62, which is fixedly mounted on the pin 63, are shown in FIGURES 1 and 7 in a spaced position, in which position the grippers prevent the first sheet of the stack from bearing against the drum.

On rotation of the pin 63 in the clockwise direction, the grippers are brought into a retracted position (FIGURES 5 and 6), in which retracted position the grippers become lodged in grooves 24 (FIGURE 2) in the drum.

Extracting grippers 71 (FIGURES 1 and 2) are disposed in the same grooves 24 in the drum in the neighbourhood of the presser roller 25, so as to move the sheets away from the drum and to guide them into a machine fed with sheets by the apparatus.

Nozzles 51 (FIGURES 1 and 2) are disposed close to the leading edge of the first sheets along a line parallel to the said edge. The said nozzles direct a jet of compressed air, which is fed through the pipes 52, on to the surface of the drum. The direction of the said jet of air forms an angle smaller than 45° with the perpendicular to the surface of the drum at its point of intersection with the latter.

In FIGURES 1 and 2 there is shown one of the devices which are provided to ensure correct driving of each sheet regardless of the pressure to which it is subjected by the other sheets, that is to say, regardless of the size of the stack situated on the inclined plate 12.

The said device comprises two rollers 81 (FIGURES 1 and 2) mounted on the same shaft 82 and driven by the latter at the same angular velocity as the drum. The said rollers have substantially the same diameter as the drum and comprise a sector 83 having an appreciable coefficient of friction. The said sector is comprised with an angle B and is disposed, as shown in FIGURE 1, in such manner as to come into contact with the sheet to be driven at the instant when the negative pressure existing within the drum is applied to the sheet through the orifices in the bar of the drum 22.

The alignment of the sheets along the vertical wall 14 before they are driven by the drum 22 is effected in the embodiment now being described by means of a device comprising two identical rollers 91 (FIGURES 1 and 2) continuously rotated by a shaft 92 at the same angular velocity as the drum and in the direction indicated by the arrow in FIGURE 2. The said rollers comprise a friction sector 93 (FIGURE 2) so as to exert on the first sheet to be driven an appreciable lateral tractive force during a period of the cycle of rotation of the drum which precedes that during which the said sheet is taken from the stack.

Suction nozzles 56 are disposed along the lower part of the bearing wall 13 (FIGURE 1). They are provided with a deflector 57 and communicate through the duct 58 with a system (not shown) adapted to set up a predetermined negative pressure which may be lower than that obtaining within the drum.

The device operates in the following manner: Sheets of different size are disposed in packs on the inclined slideway 12 (FIGURE 1) against the vertical wall 14, each pack having previously been so formed that the sheets therein are approximately aligned along the transverse edge which is to be situated against the slideway and along the longitudinal edge which is to be situated against the wall. The first sheets which are to be driven by the apparatus then take the position illustrated in FIGURE 1 and are maintained in spaced relationship to the drum 22 by the grippers 61 during the starting period, which comprises the setting-up of the negative pressure within the drum, the commencement of the rotation of the latter and the dispatch of compressed air to the nozzles 51.

Figure 5:
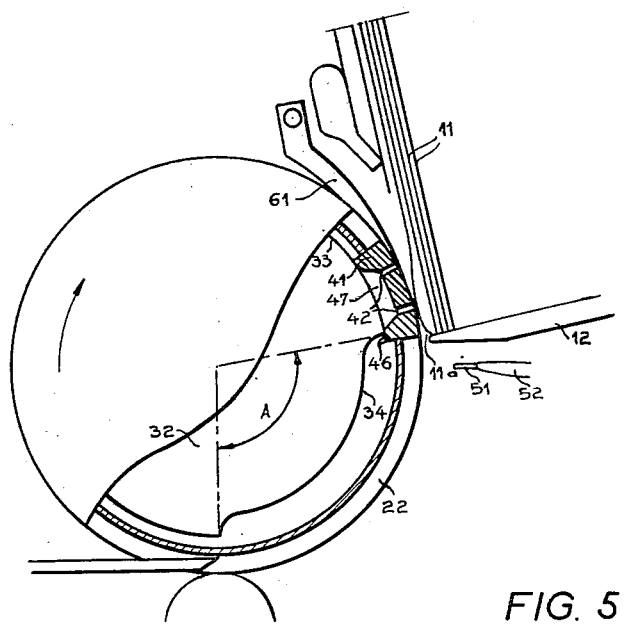

The grippers 61 are retracted at a predetermined instant during the cycle of rotation of the drum before the bar 41 enters the angle A (FIGURE 5). The jets of compressed air directed by the nozzles 51 on to the surface of the drum then have the effect of separating from the stack the lower part of the sheet 11a which lies at the front of the stack and bringing it towards the surface of the drum. The suction nozzles 56 accentuate this effect.

Before the bar 41 enters the angle A, the cavity 47 is in communication with the atmosphere through the orifices 42, as will be seen from FIGURE 5, and is separated from the negative pressure existing within the drum by the fluid-tight joints formed between the outer surfaces 33 of the shut-off member 32 and the inner face 46 of the bar.

As will be seen from FIGURE 6, when the bar enters the angle A, the cavity 47 enters into communication with the opening 34 of the shut-off member 32 and the negative pressure is simultaneously applied to all the orifices 42 of the bar.

From this instant, the front sheet 11a of the stack adheres to the drum 22 and is carried along thereby in the direction indicated by the arrow. At the same time, the friction sectors 83 of the rollers 81 (FIGURE 1) come into contact with the sheet 11a and exert thereon a downward driving force.

This force is proportional to the force with which the sheet is pressed against the rollers 81 by the other sheets of the stack. It can therefore compensate to an appreciable extent for the frictional forces which are exerted on each face of the said sheet and which are also proportional to the said force, so that the tractive force which is to be supplied by the drum for driving it remains low and independent of the weight of the stack of sheets. Means (not shown in the drawings) are provided to prevent, on operation, contact of the friction sectors 83 with the sheet 11a.

Outside the period during which the first sheet is extracted from the stack, the rollers 81 maintain this sheet against the repelling effect which may be produced by the jets of compressed air directed by the nozzles 51 on to the surface of the drum. With a view thereto, the periphery of the said rollers has a coefficient of friction of appropriate value.

While the sheet is being carried along by the means just described, its leading edge slides between the presser roller 25 (FIGURE 7) and the drum. From this instant, the sheet can be driven without the aid of the pneumatic device. The action of the said device is interrupted when the bar 41 leaves the angle A (FIGURE 7), so that the cavity 47 is no longer in communication with the interior of the drum, and the negative pressure is no longer applied to the orifices 42. The extracting grippers 71 cause the sheets to move away from the drum.

During an interval of the cycle of rotation of the drum, the retaining grippers 61 return to their spaced position. This movement can commence before the sheet extracted at the beginning of this cycle is completely removed from the stack (FIGURE 7). The grippers again disappear into the grooves 24 at the end of the cycle before the bar 41 enters the angle A (FIGURE 5).

The cyclic movement of the grippers just described has the effect of slightly repelling the stack of sheets level with the slideway 12 and of facilitating the separation of the first sheet to be extracted from the stack.

The same effect could be obtained by means of another device with which the grippers 61 are actuated only when required, for the purpose of preventing the sheets from being driven while maintaining them in spaced relation to the drum.

Similarly, the stack could be cyclically repelled at other levels, so as substantially to reduce the pressure exerted by the said stack on the sheet 11a situated along the bearing plate 13 at the instant when it is removed by the drum. For example, a roller such as 81 forming a cam may be employed for this purpose.

The friction due to the bearing plates 13 may be reduced by causing the air to circulate between it and the sheet 11a or by polishing its face in contact with the said sheet, or again by subjecting it to appropriate characteristic vibrations. The said plate may also be completely or partially replaced by a series of rollers 86 of small diameter or by an endless belt 87 as shown in FIGURE 8, which endless belt may exert a driving action during a part of each cycle.

For the purpose of reducing and adjusting the pressure exerted by the stack of sheets on the sheet situated along the bearing plate 13, it is proposed in accordance with the invention to provide on the slideway 12 a belt 96 (FIGURE 8), the advance of which may be controlled in accordance with the said pressure.

The essential elements of FIGURE 1 have been reproduced with the same references in FIGURE 9. The inclined slideway 12 supports in addition, as shown in FIGURE 9, a belt 96 mounted on rollers 102 and 103. The said rollers are disposed in apertures 121′ and 122′ (FIGURE 10) respectively in the slideway 12. The roller 102 turns freely on its spindle 104, while the roller 103 is fast with its spindle 105, which is driven through pulleys 106 and 107 and a belt 108 by an electric motor 111. The feed circuit of the said motor is controlled, as will hereinafter be described with reference to FIGURE 11, by means of an electric contact actuated by a differential pressure-measuring capsule 121 disposed as illustrated in FIGURE 9, the operation of which will be described with reference to FIGURE 11.

The differential pressure-measuring capsule 121 employed in this embodiment of the invention is commercially known under the name "Etamic type SI No. 20,528." It comprises essentially an enclosed space 122 (FIGURES 9 and 11) forming two chambers 123 and 124 (FIGURE 11) separated by a flexible wall 125 which acts by resilient deformation on an electric contact 112 disposed in the feed circuit of the motor 111. The contact 112 is closed or opened, depending upon whether the difference between the pressures obtaining in the chambers 124 and 123 is or is not higher than a given value.

The chamber 123 communicates with a duct 126 which receives through a jet nozzle 127 compressed air supplied through the distribution channel D and which feeds this compressed air to a measuring nozzle 130. The chamber 124 communicates with a duct 128 which receives through a jet nozzle 129 compressed air supplied through the distribution channel D and which feeds said compressed air to an orifice 131, the cross-sectional area of which is adjustable by means of a pointed screw 132. The distribution channel D is fed with compressed air by means of any appropriate system (not shown).

The differential pressure-measuring capsule operates in the following manner: If the flows of air through the nozzle 130 and the orifice 131 respectively are zero, the pressures obtaining in the chambers 123 and 124 are equal to the pressure in the distribution channel D, but if the air flows through the nozzle 130 or the orifice 131, a pressure drop is produced in the chamber 123 or in the chamber 124 as a function of the flow of air through the nozzle 130 or the orifice 131 respectively.

There corresponds to a given adjustment of the pointed screw 132, and consequently to a given flow of air through the orifice 131, a predetermined flow of air through the nozzle 130, above which the contact 112 closes.

The nozzle 130 is fitted in the slideway 12 as illustrated in FIGURE 9 in such manner that the opening 133 (FIGURE 10) of the nozzle is situated on that face of the said slideway on which there rests the leading edge of the sheets 11 (FIGURE 9).

Owing to this arrangement the flow of air through the aperture 133 depends upon the closeness of the stacking of the sheets situated above it, because when the sheets are not closely stacked, a part of the compressed air supplied to the nozzle readily infiltrates between the said sheets. If the flow of air through the nozzle 130 then exceeds the value beyond which the contact 112 (FIGURE 11) closes, the motor 111 is fed and drives the belt 96 (FIGURE 9), which thus advances the sheets which it carries, towards the end 13 of the magazine in the direction indicated by the arrow Av in FIGURE 10. The sheets situated above the opening 133 then become closely stacked, so that the sectional area open to the passage of air between them decreases. When the flow of air leaving the nozzle 130 falls below a predetermined value, the contact 112 opens and thus stops the advance of the belt 96.

It will be noted that the compressed air supplied to the nozzle 130 can escape, not only by infiltrating between the sheets situated above the opening 133, but also perpendicularly to the plane of FIGURE 9, along the leading edge of those of the said sheets which do not rest perfectly on the slideway, that is to say, perpendicularly to the plane of FIGURE 9.

The flow of air through the nozzle 130 therefore depends not only upon the stacking of the sheets situated above the opening 133, but also upon the value of the space which may exist between the leading edge of the said sheets and the slideway.

Owing to the irregularities in the alignment of the leading edge of the sheets situated in the magazine, the flow of air leaving the opening 133 may vary while the sheets are passing through the opening, whereas the stacking of the sheets remains unchanged.

In order to render the advance control device insensitive to such irregularities in alignment of the leading edge of the sheets, the opening of the nozzle 130 has been given a form such that the number of sheets which can be simultaneously situated on the said opening is sufficient to ensure that the cross-sectional area open to the air along the leading edge of the sheets is substantially constant, taking into account the conditions of alignment of the sheets which it is possible to obtain in practice.

If the sheets are roughly aligned by hand before being placed in the magazine, it is found that the opening 133 must extend over a length equal to the thickness of a stack of about 120 sheets in order that the device may operate correctly.

The opening 133 may then have the elongated form illustrated in FIGURE 10, but slots of different form, either parallel or non-parallel to the direction Av in which the sheets are advanced, may also be suitable. In accordance with another embodiment of the invention, the single opening 133 may be replaced by a series of openings situated side-by-side in such manner that the outermost openings are spaced apart by a distance equal to the previously-defined critical length. It is also possible to use a number of openings or a number of series of openings situated in positions other than that of the opening 133 in FIGURE 10.

The foregoing description relates only to a particular example of a manner of carrying the invention into practice, and it will be obvious that many modifications may be envisaged within the scope of the invention.

Thus, the opening 133 (FIGURE 10) may be situated between the belt 96 and the wall 14. The belt may then extend up to the lower end of the slideway 12.

In order to simplify the drawings, it has been assumed that the device for advancing the sheets towards the extracting position consists of a single belt 96. It will be obvious that a number of narrower belts may be disposed side-by-side and simultaneously driven. They may advantageously be subjected to vibrations along at least a part of the feed path of the sheets in order to regularise the alignment and the spacing of the latter. The belts may also be replaced by feed shoes fitted in the slideway.

In an apparatus embodying the invention, it has been possible to control correctly the advance of sheets having a thickness of from $6/100$ to $17/100$ mm., a width of from 75 to 115 mm. and a length of from 150 to 210 mm., employing a nozzle having a slot-like aperture, of which the largest dimension, parallel to the direction Av, is 15 mm. and the width 2 mm.

The differential pressure-measuring capsule employed was the type commercially known under the name "Etamic type SI No. 20,528."

With the device previously described it is possible successively to bring each sheet from the stack to the extracting position while limiting the pressure exerted by the stack of sheets on the first sheet, and it is sufficient in most cases to ensure correct extraction of the sheets.

However, there is also provided means for positively effecting the application of the leading edge of the sheets against the extracting member in order to render possible the extraction of sheets such as 11b and 11c (FIGURE 9), the leading edge of which has a pronounced curvature.

More specifically, in the case where the feed apparatus comprises retaining grippers, it is proposed to cause the said leading edge to adhere to the said retaining grippers during the retracting movement of the latter. Modifications are made to the said grippers in order to achieve this result.

FIGURES 12 and 13 show a retaining gripper 61 adapted to the case where suction cowls 560 (FIGURES 9 and 10) are disposed in the grooves 24 in the drum to increase the adhesion of the sheets to the drum. The said grooves are then wider and deeper than those illustrated in FIGURE 1. The drum portions remaining on either side of the said grooves are denoted by the references 210 and 214 in FIGURE 10.

The cowls 560 (FIGURES 9 and 10) communicate with the duct 580 through a system (not shown) adapted to establish and maintain a predetermined negative pressure in the said cowls, and their opening 561 is situated within the grooves 24 in the drum, behind the grippers 61. The said grippers are shown in the spaced position in FIGURE 9.

The end 611 (FIGURE 12) of each gripper consists of two identical plates 612 and 613 (FIGURE 13), of which the edge intended to come into contact with the sheets comprises a convex portion 614 (FIGURE 12) which coincides with the surface of the drum as indicated in FIGURE 4 when the grippers are retracted.

In order to show the space occupied by the said end 611 of the gripper in the groove 24 in which it is disposed, the positions of the edges of the said groove when the end of the gripper is lodged therein are represented by the lines 241 and 242 in FIGURE 13. It will be seen that the end of the gripper forms a lattice in the groove 24, the plates 612 and 613 constituting the bars of the said lattice.

Thus, when the grippers are in the retracted position (FIGURE 14), a sheet 11a applied to the drum under the action of the negative pressure obtaining in the cowls 560 rests both against the edges 241 and 242 (FIGURE 13) of the grooves and against the edges 614 of the plates 612 and 613 of the grippers and cannot be deformed in a manner prejudicial to its extraction from the magazine.

On the other hand, when the grippers are in the spaced position (FIGURE 9), a suction effect is exerted on the first sheet of the stack between the two plates of each gripper so that, during their return to the retracted position, the grippers positively drive the said sheet and apply it against the wall of the drum.

FIGURE 14 shows the grippers in the retracted position and the sheet 11a applied against the drum 21 by the suction effect produced by the suction cowls through the grippers.

This figure also shows a nozzle 510 let into the end of the slideway 12, so that its opening 511 is situated on that face of the said slideway on which the sheets of the stack rest. The nozzle 510 is connected to a source of compressed air by the tube 520.

During the return of the grippers 61 towards their retracted position, the compressed air leaving the nozzle 510 infiltrates between the first sheet 11a (FIGURE 14), which adheres to the grippers, and the adjacent sheet and maintains the leading edge of the latter spaced away from the leading edge of the first sheet as shown in FIGURE 14.

A modified embodiment of the invention is illustrated in FIGURES 15 and 18. The retaining grippers 61 are hollow and that one of their edges which is intended to come into contact with the sheets (side situated on the right in FIGURE 15) is formed with suction apertures 616 (FIGURES 15 and 16) and comprises a concave portion 615.

The said grippers are fast with the pin 63 (FIGURES 15, 16 and 18), which is hollow and is formed with apertures 631 (FIGURES 15 and 16) to place the interior of each gripper 61 in communication with a vacuum pump (not shown), which is connected to one of the ends of the pin 63.

When such grippers are employed, the drum 21 is advantageously formed, as shown in FIGURE 18, of a series of flat elemental drums (210 to 213) and of a series of discs (215 to 217) each disposed between two adjacent elemental drums. The interval between two adjacent elemental drums (such as 210 and 211, FIGURE 18) is then divided into two intervals (24/0 and 24/1), into each of which one gripper 61 is inserted. The width of these intervals is such that the space remaining between the grippers and the edges of the said intervals is reduced to the clearances necessary for the movement of these grippers without friction in relation to the said edges.

When the grippers are in the spaced position and return to their retracted position, their suction orifices 616 serve to cause the first sheet of the stack to adhere to the said grippers for carrying it towards the drum.

When the grippers approach their retracted position, the orifices 616 penetrate into the intervals such as 24/0, 24/1 between the drums and the discs and the sheet is detached from these orifices by the peripheral surface of the drums and of the discs, and when the grippers are in the retracted position (FIGURE 17) the spaces between the concave portion 615 of the grippers and the edges of the intervals in which these grippers are situated constitute suction cowls, which are placed under negative pressure through the apertures 616 in the grippers and which improve the adhesion of the sheets to the drum during their extraction, in the same way as the suction cowls 560 employed in the constructional form illustrated in FIGURES 9, 10 and 14.

It will be appreciated that the form of gripper just described may be modified, for example, and that a hollow gripper provided with one or more suction orifices may have the form of the gripper illustrated in FIGURES 12 and 13.

In addition, means are provided to control the value of the negative pressure existing within the grippers, so as to facilitate the detachment of the sheet adhering to the said grippers at the instant when the suction orifices enter the grooves in the drum.

It will be obvious that many modifications, substitutions or omissions will be possible in the arrangements hereinbefore described without departing from the scope of the invention. Notably, the whole apparatus as illustrated in FIGURES 1 and 2, for example, may operate after rotation through an appropriate angle about a horizontal axis of the wall 14. The device 91, 92 for the initial alignment of the sheets on the wall 14 is then unnecessary.

In another embodiment of the invention, suction orifices may be formed in the said wall 14 with the object of aligning the sheets against the said wall by pneumatic action.

Driving devices other than the drum 22 may be substituted for the latter or employed in combination therewith.

A continuous or intermittent negative pressure may be set up in the grooves 24 situated to the left of the bar 41 in FIGURE 2, so as to cause the sheets to adhere to the drum beyond the zone subject to the negative pressure exerted through the orifices 42.

The apparatus is particularly designed for feeding cheques to machines, such as sorting, computing and printing machines, which are to carry out operations on, or by means of, the said cheques, such machines being provided with means for reading data written on the said cheques.

What is claimed is:

1. An apparatus for removing sheets one by one from the front of a stack of sheets comprising in combination a continuously rotating feeding drum, the axis of which is in fixed position and the cylindrical periphery of which is provided with a circular groove, means for carrying said stack of sheets and urging it towards said drum in such manner as to bring the front sheet of the stack in a fixed plane which is tangent to said cylindrical periphery of the drum substantially along the leading edge of said front sheet, means for permanently creating a low air pressure along the front face of said front sheet in the vicinity of its leading edge, a stationary air blowing nozzle so positioned as to direct a jet of air towards the cylindrical periphery of the drum in the vicinity of the leading edge of the front sheet, a gripper rockingly mounted to swing into and out of said circular groove of the drum, said gripper in its spaced position out of said groove, pressing the leading edge of said front sheet against the stack and keeping said edge out of contact with said drum, whereas said gripper in its retracted position inside said groove does not keep said edge of said front sheet out of contact with said drum, whereby the leading edge of said front sheet is drawn away from the stack, as soon as said gripper swings into the circular groove, by virtue of the low air pressure existing along the front face of said front sheet, while the next sheet of the stack is kept separated from the front sheet by the air blown from said air blowing nozzle.

2. An apparatus according to claim 1, wherein said means for creating a low air pressure comprises a suction cowl disposed in a circular groove of said drum.

3. An apparatus according to claim 2, wherein said gripper comprises two parallel identical plates of which the edges intended to come into contact with the front sheet have a convex portion which registers with the cylindrical surface of said drum when the gripper is in its retracted position inside the groove, whereby the front sheet drawn to the drum, under the action of the negative pressure obtained in the cowl, rests against said edges of the plates.

4. An apparatus according to claim 1, having a magazine comprising an inclined slide wall along which the leading edges of the sheets in the stack can rest, said magazine further comprising driving means adapted to engage said leading edges of said sheets in the stack and to urge said sheets towards said first plane in which the front sheet of the stack is brought.

5. An apparatus according to claim 4, said apparatus including means for measuring the pressure exerted by the stack of sheets on the front sheet, and means controlled by said last-mentioned means for acting on said driving means.

6. An apparatus according to claim 5, wherein said means for measuring said pressure comprises means for measuring a flow of air through a nozzle communicating with a source of compressed air and opening on that face of the slide wall on which rest the sheets of the stack.

7. An apparatus according to claim 6, wherein the opening of said nozzle on said slide wall has an elongated form, the length of which is perpendicular to the leading edges of the sheet.

8. An apparatus according to claim 1, having a magazine comprising an inclined slide wall along which the leading edges of the sheets in the stack can rest, and a bottom wall disposed along said plane, said magazine further comprising movable means adapted to engage the front face of the front sheet.

9. An apparatus according to claim 8, wherein the magazine has a side wall perpendicular to said slide wall and said bottom wall of said magazine has an opening, wherein a roller with a sector of friction material is rotatably mounted so as to project through said opening and to engage the front sheet of the stack and wherein said roller is adapted to be driven in synchronism with the movement of said feeding drum so that said sector urges said front sheet towards said side wall before the operation of removing said sheet away from the stack.

10. An apparatus according to claim 1, wherein said gripper is provided with an opening and wherein means are provided to apply suction through said opening whereby the front sheet of the stack is drawn against said gripper.

11. An apparatus according to claim 1 wherein a portion of said drum is made up of an embedded part provided with radial passages and forming one of the elements of a valve device which is located inside the drum and is so arranged as to establish a vacuum through said passages, over a desired arcuate interval, in the course of the rotation of the drum.

12. An apparatus according to claim 11, wherein each passage has a cylindrical portion and a wide-mouthed portion, the section of said wide-mouthed portion by its plane of symmetry being approximately a circle.

13. An apparatus according to claim 11, wherein said embedded piece which forms one of the members of the valve device has a concave cylindrical inner surface which slides, during a part of the rotation of the drum, on a convex cylindrical surface of another member of the valve device.

14. An apparatus according to claim 13, wherein said concave cylindrical surface of said embedded piece surrounds a cavity of said piece at the bottom of which open the said passages.

15. An apparatus according to claim 14, wherein means are provided for creating a low air pressure of constant value in said groove in the periphery of the drum.

16. In an apparatus for extracting sheets one by one from the front of a stack of sheets comprising: sheet extracting means adapted to seize the leading edge of a sheet lying adacent thereto, a magazine having a bottom wall adjacent to said sheet extracting means, and a slide wall which is inclined towards said bottom wall that the sheets of the stack placed in the magazine, each with its leading edge resting on said slide wall, are urged under the action of gravity towards said bottom wall, and driving means adapted to engage said leading edge of each sheet in the stack and to urge it towards said bottom wall, an arrangement for limiting the pressure exerted by the stack of sheets on the front sheet, said arrangement consisting of means for measuring said pressure and means controlled by said pressure measuring means for actuating said driving means, said pressure measuring means comprising a nozzle arranged in said slide wall in the vicinity of said bottom wall, for directing streams of air between sheets located in the vicinity of said bottom wall, means for supplying compressed air to said nozzle and means responsive to the magnitude of the flow of air through said nozzle for controlling said actuating means.

References Cited in the file of this patent

UNITED STATES PATENTS

| | | |
|---|---|---|
| 664,429 | Pettee | Dec. 25, 1900 |
| 854,222 | Knapp | May 21, 1907 |
| 1,207,365 | Broadmeyer | Dec. 5, 1916 |
| 1,618,182 | Frohn | Feb. 22, 1927 |
| 1,744,814 | Swart | Jan. 28, 1930 |
| 1,961,401 | Steinmann | June 5, 1934 |
| 2,031,078 | Spiess | Feb. 18, 1936 |
| 2,942,877 | Fowlie et al. | June 28, 1960 |
| 2,973,200 | Wiener et al. | Feb. 28, 1961 |